(12) United States Patent
Liu et al.

(10) Patent No.: US 7,510,363 B2
(45) Date of Patent: Mar. 31, 2009

(54) BUNDLE HANDLING DEVICE

(75) Inventors: Benjamin Chaoning Liu, Silver Spring, MD (US); Jason Jin Park, Baltimore, MD (US); Kevin David Bruner, Brooklyn, NY (US); Robert Louis Stone, Perry Hall, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 6 days.

(21) Appl. No.: 11/678,903

(22) Filed: Feb. 26, 2007

(65) Prior Publication Data

US 2007/0201970 A1    Aug. 30, 2007

Related U.S. Application Data

(60) Provisional application No. 60/776,228, filed on Feb. 24, 2006.

(51) Int. Cl.
*B65B 69/00* (2006.01)
(52) U.S. Cl. ...................................... 414/425
(58) Field of Classification Search ................ 414/420, 414/422, 575, 583, 593, 743, 809, 811, 425, 414/414
See application file for complete search history.

(56) References Cited

U.S. PATENT DOCUMENTS

| | | | | |
|---|---|---|---|---|
| 2,279,643 A * | 4/1942 | Silver | ........................... | 211/11 |
| 3,863,789 A * | 2/1975 | Hunter et al. | ............... | 414/421 |
| 4,989,917 A * | 2/1991 | Schmidt, Jr. | ................. | 298/11 |
| 5,771,661 A * | 6/1998 | Martin | ...................... | 53/382.1 |
| 5,855,232 A * | 1/1999 | Oda et al. | ....................... | 141/83 |
| 6,120,231 A * | 9/2000 | Christ et al. | ................ | 414/422 |
| 6,129,498 A * | 10/2000 | Ulbrich | ....................... | 414/420 |
| 6,319,118 B1 * | 11/2001 | Carr et al. | .................... | 460/114 |
| 6,390,750 B1 * | 5/2002 | Niewohner | .................. | 414/21 |
| 6,394,736 B1 * | 5/2002 | Derby et al. | ................ | 414/583 |
| 6,565,308 B2 * | 5/2003 | Derby et al. | ................ | 414/583 |
| 6,634,846 B1 * | 10/2003 | Enenkel et al. | ......... | 414/416.06 |
| 6,733,225 B1 * | 5/2004 | Barnett et al. | ............... | 414/420 |
| 6,848,878 B2 * | 2/2005 | Jessup | ........................ | 414/420 |
| 6,896,471 B2 * | 5/2005 | Svyatsky et al. | ............ | 414/421 |
| 7,083,060 B2 * | 8/2006 | Pickler | ....................... | 220/1.5 |
| 7,287,946 B2 * | 10/2007 | Bonerb | ....................... | 414/412 |
| 2002/0122714 A1 * | 9/2002 | Derby et al. | ................ | 414/583 |
| 2002/0154978 A1 * | 10/2002 | Neufeldt | ..................... | 414/422 |
| 2008/0034652 A1 * | 2/2008 | Hunter et al. | ............ | 47/58.1 R |

* cited by examiner

*Primary Examiner*—Saúl J Rodríguez
*Assistant Examiner*—John-Paul N Mitchell
(74) *Attorney, Agent, or Firm*—Rothwell, Figg, Ernst & Manbeck, P.C.

(57) ABSTRACT

A bundle handling device is provided that includes a frame, a body, a scoop, a ramp and a controller. The body is mounted to the frame and includes a first opening through which bundles are loaded and a second opening through which bundles are discharged. The scoop and the ramp are mounted to the body. The scoop covers a substantial portion of the second opening, while the ramp covers the remaining portion. The controller is coupled to a plurality of actuators and a plurality of sensors, and controls the rotation of the body, the opening and closing of the scoop and the opening and closing of the ramp, in order to discharge a metered portion of bundles through the second opening.

20 Claims, 3 Drawing Sheets

BUNDLE HANDLING DEVICE

CROSS REFERENCE TO RELATED APPLICATIONS

This application claims the benefit of U.S. provisional application Ser. No. 60/776,228, filed on Feb. 24, 2006, the contents of which are incorporated herein by reference.

BACKGROUND OF THE INVENTION

In any material handling industry, such as mail processing, there is always a need to "dump" a quantity of packages from a container, without damaging the packages, prior to further processing of the packages. For example, the United States Postal Service (USPS) is evaluating an Automatic Bundle Separation Unit (ABSU) to introduce mail bundles to an Automated Flats Sorting Machine Automatic Induction (AFSM-ai). The ABSU is composed of two subsystems: a container tilter (dumper) and a bundle separator.

Prior to separation, the bundles (e.g., flats, etc.) are loaded into a container (e.g., a hamper, wiretainer, pallet box, etc.) from an upstream process. An operator receives the loaded container and places the container into the container tilter, which is adjacent to the bundle separator. The container tilter then rotates the container, in the direction of the platform, in order to dump the bundles out of the open top of the container and onto the bundle separator. Immediately after the bundles fall onto the bundle separator, the initial separating process begins. After a series of separations along various conveyors, the bundles form a single file for downstream facility use.

These open-top containers suffer from several drawbacks. For example, the bundles tend to fall out of the container and onto the bundle separator before the container tilter has completed its full rotation. The height from which the bundles prematurely exit the container causes the bundles to strike the bundle separator with excessive force, which may cause the bundles to break apart or otherwise become damaged. Due to the inherently chaotic nature of this process, the number of bundles discharged out of the container is difficult to control. For example, a large number of bundles may fall on one specific area of the bundle separator, causing the lower bundles in the pile to become damaged. Once loosened or damaged, an operator must cull and/or reorganize these pieces, thereby reducing productivity and increasing the bundle separation processing time.

BRIEF SUMMARY

Embodiments of a bundle handling device include a frame, a body, a scoop, a ramp and a controller. The body is mounted to the frame and includes a first opening through which bundles are loaded and a second opening through which bundles are discharged. The scoop and the ramp are mounted to the body. The scoop covers a substantial portion of the second opening, while the ramp covers the remaining portion. The controller is coupled to a plurality of actuators and a plurality of sensors, and controls the rotation of the body, the opening and closing of the scoop and the opening and closing of the ramp, in order to discharge a metered portion of bundles through the second opening.

DETAILED DESCRIPTION

Embodiments of the present invention overcome the limitations and problems of the prior devices noted above by metering the discharge of the bundles from a bulk container onto the bundle separator. Advantageously, the present invention minimizes damage, minimizes the creation of loose mail and sequentially introduces a manageable volume of bundles into the bundle separator for further processing. While the preferred embodiment has been developed, specifically, for processing mail bundles, the teachings of the present invention are applicable to many different types of mail flows that can be dumped. Accordingly, the present invention is directed, generally, to a handling system to be used for packages, parcels, bundles of mail or any material contained in a bulk container.

Figure 1:
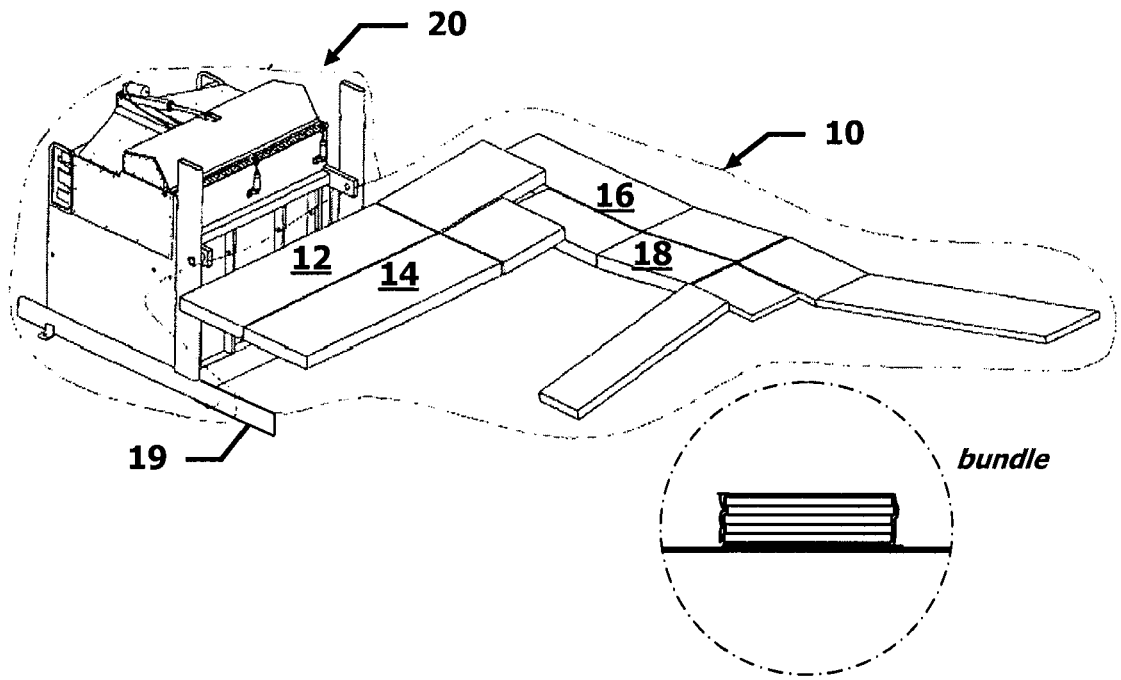
FIG. 1 depicts a metering container and a bundle separator, in accordance with an embodiment of the present invention.

FIG. 1 depicts a metering container tilter and a bundle separator, in accordance with an embodiment of the present invention. Bundle separator 10 includes various conveyor belts 12, 14, 16 and 18 to separate and transport the bundles for downstream facility use. The metering container tilter 20 is located adjacent to conveyor belt 12. Generally, a bundle is one or more typically flat objects gathered together. The insert depicts one example of a bundle, i.e., a stack of magazines or catalogues wrapped in plastic sheathing. Another example of a bundle is a single, typically flat object, such as a single magazine or catalogue, that may, or may not, be wrapped in protective sheathing.

Figure 2:
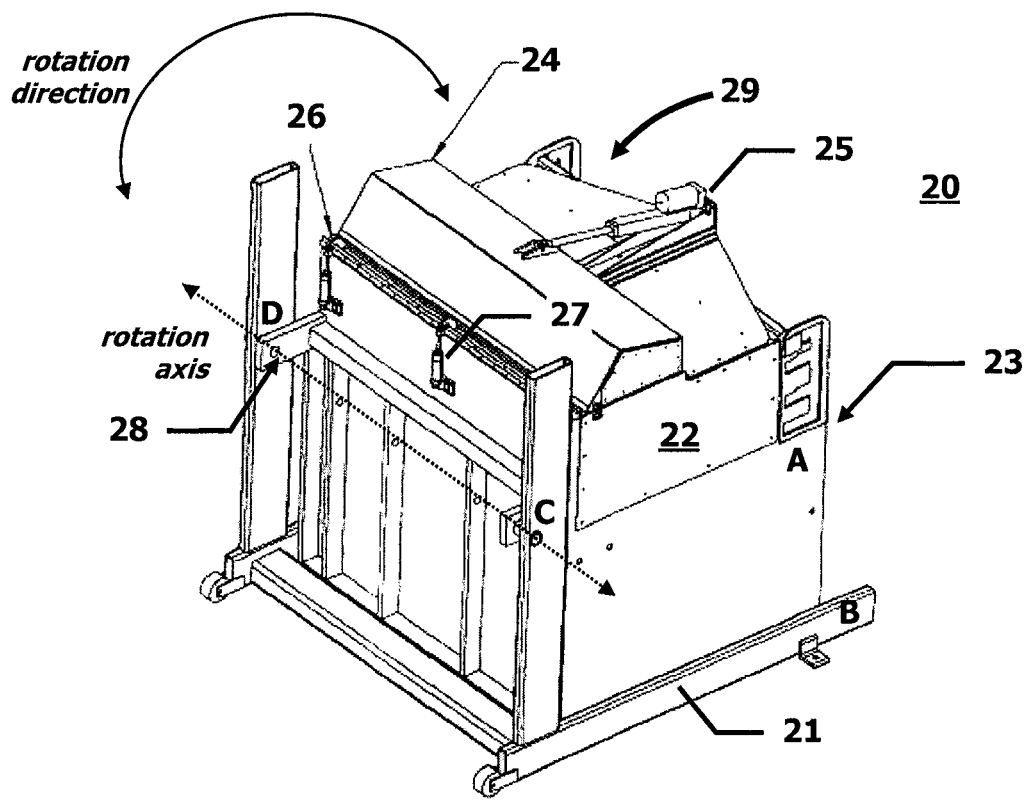
FIG. 2 depicts a bundle handling device in an upright orientation, in accordance with an embodiment of the present invention.
Figure 3:
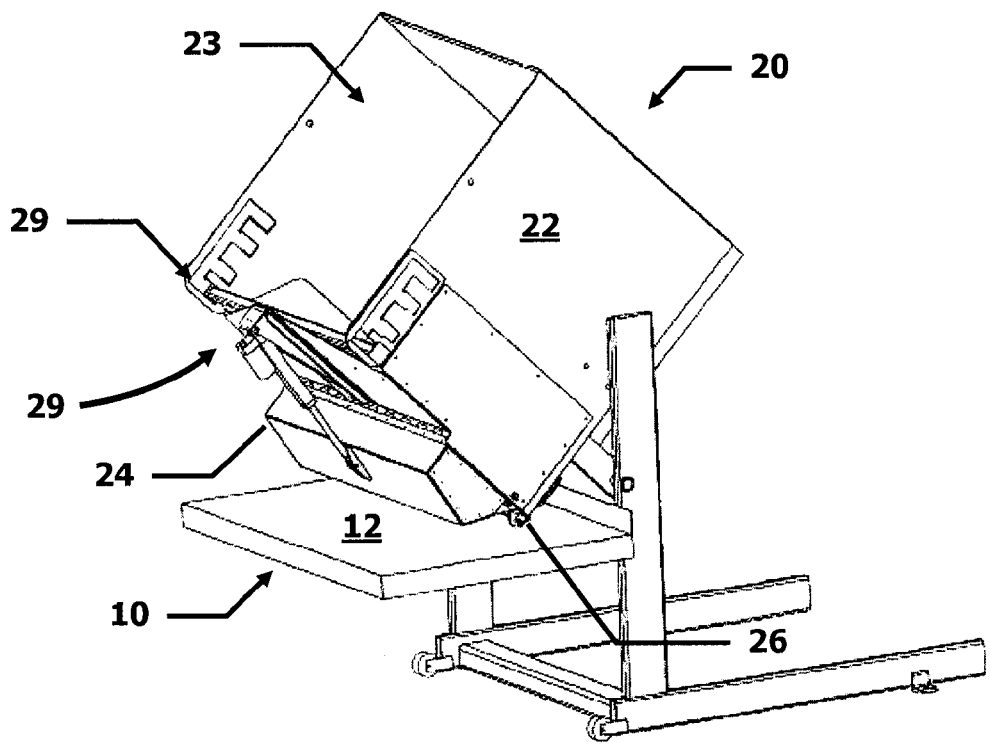
FIG. 3 depicts a bundle handling device in a discharge orientation with the scoop closed, in accordance with an embodiment of the present invention.
Figure 4:
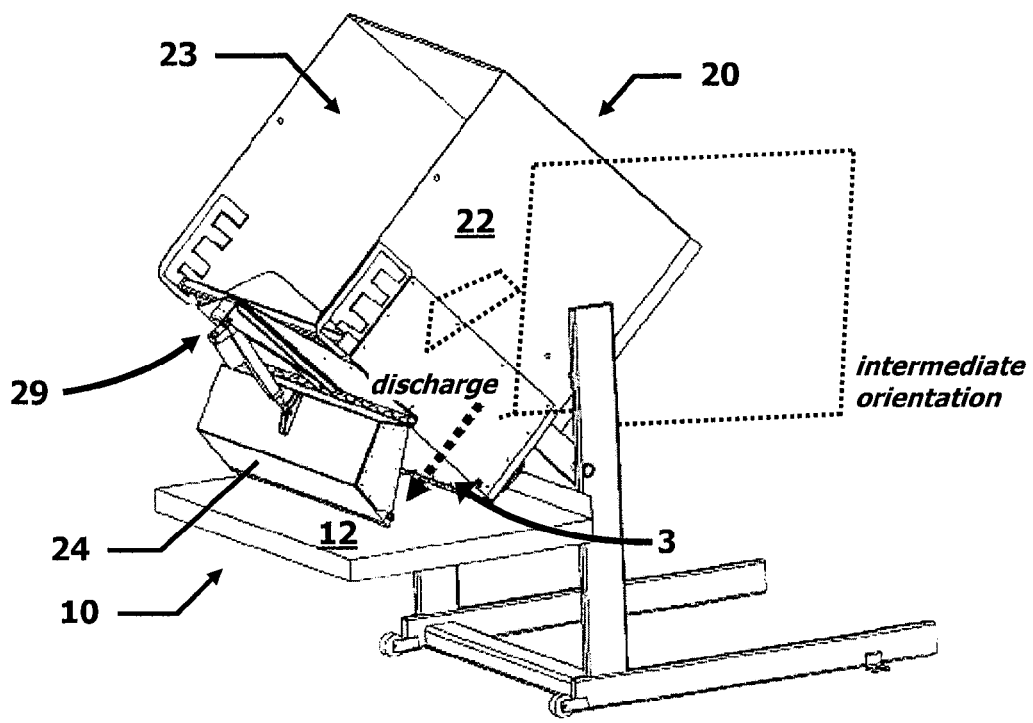
FIG. 4 depicts a bundle handling device in a discharge orientation with the scoop open, in accordance with an embodiment of the present invention.

FIGS. 2, 3 and 4 depict a bundle handling device in an upright orientation, a discharge orientation with the scoop closed, and a discharge orientation with the scoop open, respectively, in accordance with an embodiment of the present invention. Generally, metering container tilter 20 includes a fixed frame 21 on which rotatable bin 22 is mounted. Fixed frame 21 may include lateral extensions 19 to prevent metering container tilter 20 from overturning due to the rotation of bin 22. In one embodiment, bin 22 is enclosed on five sides, and an operator loads and secures the loaded bundle container (e.g., a hamper, wiretainer, pallet box, etc.) into bin 22 through side 23. To facilitate loading, side 23 may be completely open, for example, as depicted in FIGS. 3 and 4. In other embodiments, side 23 may be partially open, side 23 may include a removable access panel or door to cover the opening, etc.

Bin 22 is mounted to frame 21 about an axis of rotation 28. Bin 22 has several orientations, including an upright orientation (e.g., FIG. 2), a discharge orientation (e.g., FIGS. 3 and 4) and at least one intermediate orientation (e.g., shown in phantom in FIG. 4). When bin 22 is positioned in the upright orientation, bundles may be loaded into metering container tilter 20. In the upright orientation, top surface 29 forms an angle of about 0° with respect to the horizontal. When bin 22 is positioned in the discharge orientation, bundles may be discharged through opening 3 in top surface 29 onto conveyor belt 12 of bundle separator 10. In the discharge orientation, top surface 29 forms an angle of about 135° with respect to the horizontal. During the discharge process, bin 22 is rotated to an intermediate orientation, in which top surface 29 forms an angle of about 80° to about 45° with respect to the horizontal.

Opening 3 is closed, generally, by at least one cover. For example, a single, door, hinged on one side, may cover opening 3, or a single, sliding door may cover opening 3. Alternatively, two doors may cooperatively cover opening 3, in a clamshell arrangement, in an overlapping arrangement, etc. Generally, the cover(s) open and close to control the flow of material from bin 22 to the conveyor. Advantageously, when closed, the cover(s) permit bin 22 to rotate completely, and, when opened during discharge, the cover(s) permit the bundles, packages, etc., to have the lowest possible fall distance, thereby helping to prevent damage.

In a preferred embodiment, scoop 24 and ramp 26 are mounted over opening 3 on top surface 29. Scoop 24 rotates about one edge of opening 3 and covers a substantial portion of opening 3 when scoop 24 is in a closed position. Generally, scoop 24 covers between about 70% to about 99% of opening 3. Scoop 24 may be opened and closed, for example, using an electric, pneumatic or hydraulic actuator, such as, for example, electric piston and push rod assembly 25. Ramp 26 rotates about another edge of opening 3 and covers the remaining portion of opening 3 when ramp 26 is in a closed position. Ramp 26 may be opened and closed, for example, using an electric, pneumatic or hydraulic actuator, such as, for example, pneumatic piston and push rod assembly 27. In one embodiment, scoop 24 abuts ramp 26, while in other embodiments, scoop 24 may overlap ramp 26 or ramp 26 may overlap scoop 24.

Generally, side 23 of metering container tilter 20 faces away from bundle separator 10. After the bundle container is loaded and secured within bin 22, bin 22 is rotated, in the direction of bundle separator 10, from the upright orientation to the discharge orientation. As bin 22 rotates into the discharge orientation, the bundles move towards scoop 24 under the influence of gravity. In the discharge orientation, bin 22 does not contact the upper surface of bundle separator 10. An actuator attached to frame 21 (e.g., at Point B) and bin 22 (e.g., at Point A), such as an electric, pneumatic or hydraulic piston and push rod assembly (not shown for clarity), rotates bin 22. Alternatively, an electric or hydraulic motor (not shown for clarity) may be attached to the frame 21 and bin 22 (e.g., at Points C and/or D) to rotate bin 22.

After bin 22 has been rotated into the discharge orientation, scoop 24 is opened to allow a metered portion of the bundles to fall onto conveyor belt 12. Bin 22 is then rotated, such that top surface 29 forms an angle of about 90° with respect to the horizontal, to allow the metered portion of the bundles to disengage from bin 22, i.e., to fall completely onto conveyor belt 12. In one embodiment, ramp 24 may be opened to allow any overhanging bundles to fall onto conveyor belt 12.

In this manner, a metered discharge of bundles is accomplished, thereby reducing the damage resulting from free-falling bundles as well as from the concentration of a large number of bundles in one location.

After the metered bundles have been discharged, scoop 24 is closed. If one or more bundles overhang ramp 26 and prevent scoop 24 from closing, then ramp 26 is opened (if closed) to encourage any overhanging bundles to fall onto the conveyor belt 12. In one embodiment, bin 22 is then rotated, such that top surface 29 forms an angle of about 45° with respect to the horizontal, to encourage any overhanging bundles that did not fall onto the conveyor belt 12 to move further back into bin 22. Scoop 24 and ramp 26 are then closed, bin 22 is rotated back into the discharge orientation, which, again, moves the bundles towards scoop 24. The discharge process is repeated until bin 22 no longer contains bundles. Bin 22 is then rotated to the upright orientation, the empty bundle container is replaced with a loaded bundle container and the entire process is repeated. In a preferred embodiment, this process is controlled by an embedded controller.

Figure 5:
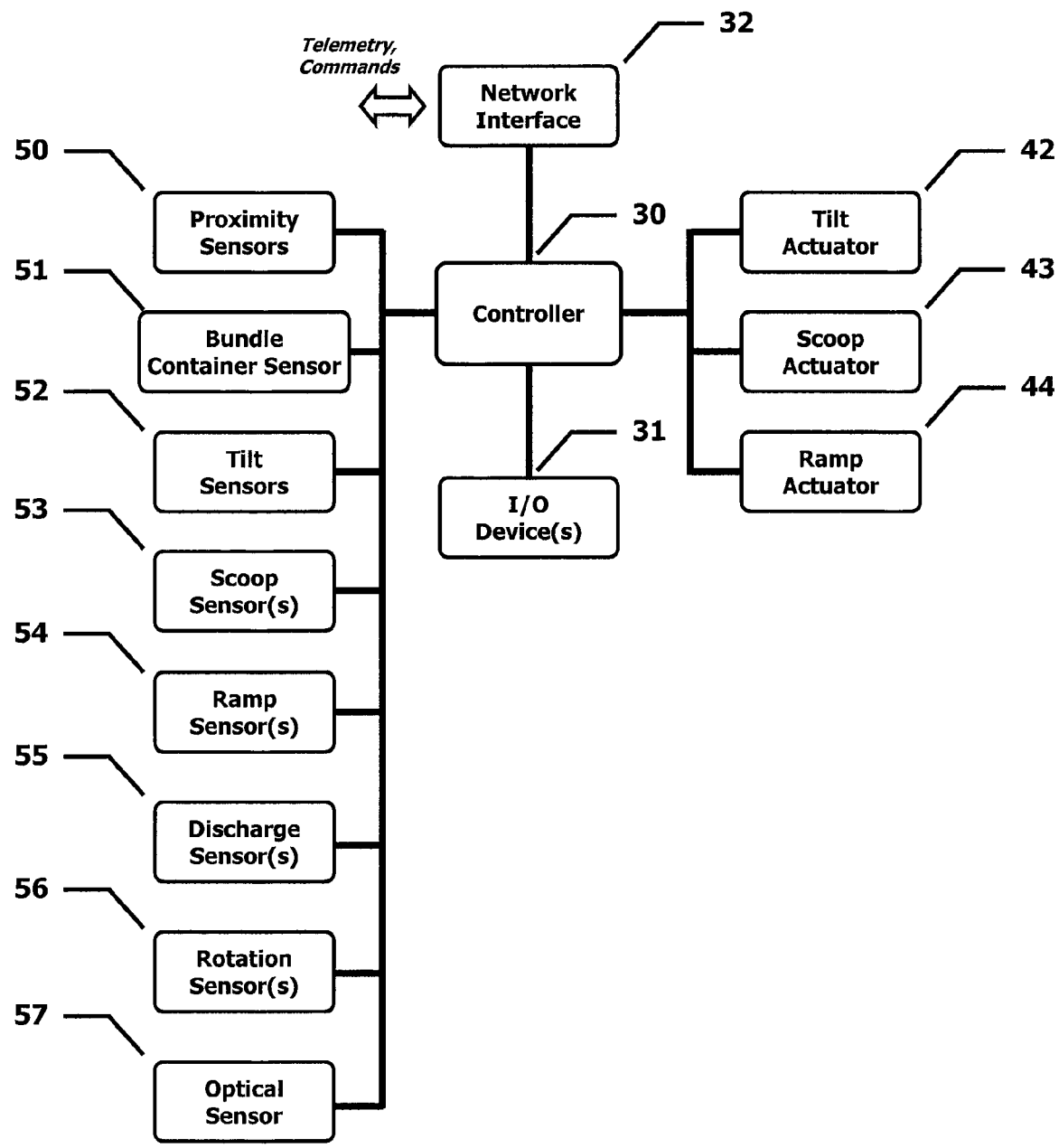
FIG. 5 presents a system block diagram for a bundle handling device, in accordance with an embodiment of the present invention.

FIG. 5 presents a system block diagram for bundle handling device, in accordance with an embodiment of the present invention. Generally, controller 30 receives data from various sensors, sends command signals to various actuators, and receives operator inputs from, and sends status indicators to, I/O devices 31. In one embodiment, controller 30 sends data to, and receives commands from, a remote computer system through network interface 32.

Controller 30 is an embedded processor, such as, for example, a microprocessor, a microcontroller, an application specific integrated circuit (ASIC), a programmable logic controller (PLC), a field programmable gate array (FPGA), etc. Various input/output devices 31 may be attached to controller 30, such as push buttons, switches, keypad(s), etc., to input various commands to the controller 30, as well as various displays, such as indicator lights, displays, etc., to provide status indications to the operator. A network interface 32 may also be coupled to controller 30, such as, for example, a wired network connection (e.g., IEEE 802.3), a wireless network connection (e.g., IEEE 802.11g), etc., to provide telemetry data to, and accept commands from, a remote computer system. Controller 30 is programmed to perform the aforementioned process in response to operator input(s) or remote commands. For example, in one embodiment, after loading bin 22 with bundles, the operator depresses a start button to begin an automated metered discharge process.

A bundle container sensor 51 is located within bin 22 to detect whether a container is present within bin 22. Various sensors may be used, such as, for example, inductive sensors, mechanical switches, etc. Controller 30 determines whether to begin the discharge process based upon the signals provided by bundle container sensor 51.

One or more discharge sensors 55 are located on, and/or close to, bin 22 to detect whether bundles are being discharged from opening 3 onto bundle separator 10. Various sensors may be used, such as, for example, optical light beam sensors, acoustic sensors, etc. In a preferred embodiment, a bank of retroreflective photodetectors are mounted just above outer edge of conveyor 14, and corresponding reflectors are mounted on bin 22. Controller 30 determines whether to complete the discharge process based upon the signals provided by discharge sensors 55.

Tilt actuator 42 is attached to frame 21 and bin 22. Controller 30 sends command signals to tilt actuator 42 to rotate bin 22, generally, between upright, discharge and intermediate orientations. Tilt actuator 42 may be an electric or hydraulic motor, a motor and push rod assembly, etc. Tilt sensors 52 are located on frame 21 and bin 22, as necessary, to indicate to controller 30 when bin 22 has acquired these orientations. Various types of sensors may be used as tilt sensors 52, such as inductive sensors, optical sensors, magnetic switches, etc. For example, one tilt sensor 52 may indicate when bin 22 is in the upright orientation, one tilt sensor 52 may indicate when bin 22 is in the intermediate position and one tilt sensor 52 may indicate when bin 22 is in the discharge orientation. Additionally, a rotation sensor 56, such as, for example, a potentiometer, is mounted proximal to rotation axis 28 to monitor the rotation of bin 22 to detect whether bin 22 is jammed, i.e., not moving. In an alternative embodiment, rotation sensor 56 may also provide data to controller 30 from which the orientation of bin 22 may be determined.

Scoop actuator 43 is attached to scoop 24 and bin 22. Controller 30 sends command signals to scoop actuator 43 to open and close scoop 24. Scoop actuator 43 may be an electric or hydraulic motor, an electric, pneumatic or hydraulic piston and push rod assembly, such as electric piston and push rod assembly 25, etc. Scoop sensor 53 indicates to controller 30 whether scoop 24 is open or closed, and may be an end-of-stroke sensor, inductive sensor, optical sensor, mechanical switch, etc.

Similarly, ramp actuator 44 is attached to ramp 26 and bin 22. Controller 30 sends command signals to ramp actuator 44 to open and close ramp 26. Ramp actuator 44 may be an electric, pneumatic or hydraulic motor, an electric, pneumatic or hydraulic piston and push rod assembly, such as pneumatic piston and push rod assembly 27, etc. Ramp sensor 54 indicates to controller 30 whether ramp 26 is open or closed, and may be an end-of-stroke sensor, inductive sensor, optical sensor, mechanical switch, etc. An optical sensor 57 is also mounted proximal to ramp 26 to detect whether one or more bundle(s) overhang ramp 26 and prevent scoop 24 from closing.

Scoop sensor 53 and/or ramp sensor 54 advantageously indicates whether one or more bundles are blocking scoop 24 or ramp 26, thereby preventing these components from closing.

For example, after bin 22 has been rotated such that top surface 29 forms an angle of about 80° with respect to the horizontal, controller 30 sends a command to scoop actuator 43 to close scoop 24. If one or more bundles prevent scoop 24 from closing completely, scoop sensor 53 detects the blockage and sends a signal to controller 30, which sends a command to scoop actuator 43 to open scoop 24. Controller 30 then sends a command to actuator 44 to open ramp 26 (if closed), which encourages the bundle(s) blocking scoop 24 to fall onto conveyor 12. In another embodiment, controller 30 may send a sequence of commands to ramp actuator 44 to open and close ramp 24 in order to dislodge the blocking bundle(s). If the blocking bundle(s) have not been dislodged, in one embodiment, controller 30 sends a command to tilt actuator 43 to rotate bin 22 to such that top surface 29 forms an angle of between about 45° to about 0° with respect to the horizontal, so that any overhanging bundles that did not fall onto the conveyor belt 12 move further back into bin 22. For example, controller 30 may send commands to tilt actuator 43 to rotate bin 22 until the data from optical sensor 57 indicates that the bundle(s) have cleared opening 3 and no longer prevent scoop 24 from closing.

In other embodiments, I/O devices 31 may be used to manually input actuator commands, as well as to display sensor data. Accordingly, the operator may control the entire process manually, or selectively override controller 30, depending on the situation.

Additionally, safety sensors 50 may be attached to strategic locations on the exterior of metering container tilter 20, such as the walls or corners of bin 22, the frame 21, etc., to detect whether an object, such as the operator, is located within a predetermined danger zone surrounding the metering container tilter 20 (e.g., 5 feet). Various sensors may be used, such as, for example, optical light beam sensors, acoustic sensors, etc. Controller 30 may interrupt the rotation of bin 22 if a signal from at least one of these sensors indicates that an operator is in danger of being struck by bin 22. The operator may also interrupt the rotation of the bin 22 by depressing an interrupt button, activating a cut-off switch, etc.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

We claim:

1. A mail bundle handling device, comprising:
   a frame;
   a body, rotatably mounted to the frame, including:
      a first opening through which a plurality of mail bundles are loaded, and
      a second opening through which mail bundles are discharged;
   a scoop, rotatably mounted to the body, to cover a first portion of the second opening;
   a ramp, rotatably mounted to the body, to cover a second portion of the second opening, the second portion being smaller than the first portion;
   a plurality of actuators for rotating the body relative to the frame and at least one of the scoop and the ramp relative to the body;
   a plurality of sensors for measuring the orientation of the body and the position of at least one of the scoop and the ramp, and for detecting mail bundles being discharged from the second opening;
   and
   a controller, coupled to the plurality of actuators and the plurality of sensors, to control the operation of the body, scoop and ramp to discharge a metered portion of mail bundles through the second opening of the body.

2. The mail bundle handling device of claim 1, wherein the body is operable between an upright orientation for loading mail bundles through the first opening, a discharge orientation for discharging mail bundles through the second opening, and an intermediate orientation for removing mail bundles that block the second opening.

3. The mail bundle handling device of claim 2, wherein the scoop is operable between a closed position covering the first portion of the second opening, and an open position exposing the first portion of the second opening.

4. The mail bundle handling device of claim 3, wherein the ramp is operable between a closed position covering the second portion of the second opening, and an open position exposing the second portion of the second opening.

5. A bundle handling device, comprising:
   a frame;
   a body, rotatably mounted to the frame, including:
      a first opening through which a plurality of bundles are loaded, and
      a second opening through which bundles are discharged;
   a scoop, rotatably mounted to the body, to cover a first portion of the second opening;
   a ramp, rotatably mounted to the body, to cover a second portion of the second opening, the second portion being smaller than the first portion; and
   a controller, coupled to a plurality of actuators and a plurality of sensors, to control the operation of the body, scoop and ramp to discharge a metered portion of bundles through the second opening of the body, wherein the plurality of actuators include:
      at least one tilt actuator, mounted to the frame and the body, to rotate the body,
      at least one scoop actuator, mounted to the body and the scoop, to rotate the scoop, and at least one ramp actuator, mounted to the body and the ramp, to rotate the scoop; and the plurality of sensors include:
at least one tilt sensor, mounted to the frame and/or the body, to measure the orientation of the body,
at least one scoop sensor, mounted to the body and/or the scoop, to measure the position of the scoop,
at least one ramp sensor, mounted to the body and/or the ramp, to measure the position of the ramp,
at least one bundle container sensor to detect whether a bundle container is located within the body,
at least one rotation sensor to detect whether the body is rotating,
at least one discharge sensor to detect whether bundles are discharging through the second opening, and
at least one optical sensor to detect whether one or more bundles are blocking the opening.

6. The bundle handling device of claim 5, wherein the tilt, scoop and ramp actuators are piston and push rod assemblies, the tilt sensor is an inductive sensor, the scoop and ramp sensors are end-of-stroke sensors, the bundle container sensor is a mechanical sensor, the rotation sensor is a potentiometer and the discharge sensor is an optical sensor.

7. The mail bundle handling device of claim 2, wherein the controller causes the body to rotate between the intermediate and discharge orientations when the discharge sensor detects discharged mail bundles, and rotates the body to the upright orientation when the discharge sensor no longer detect discharged mail bundles.

8. The mail bundle handling device of claim 1, wherein the plurality of sensors include at least one safety sensor to detect whether an object is located within a predetermined distance from the body, and wherein the controller causes the rotation of the body to stop when the safety sensor detects the object.

9. The mail bundle handling device of claim 1, further comprising a door to cover the first opening.

10. The mail bundle handling device of claim 1, wherein the mail bundles include flats.

11. A bundle processing system, comprising:
a bundle handling device, including:
a frame,
a body, mounted to the frame, including a first opening through which a plurality of bundles are loaded and a second opening through which bundles are discharged, the body being operable between an upright orientation for loading bundles through the first opening, a discharge orientation for discharging bundles through the second opening, and an intermediate orientation for removing bundles that block the second opening,
a scoop, mounted to the body, to open and close a first portion of the second opening,
a ramp, mounted to the body, to open and close a second portion of the second opening, the second portion being smaller than the first portion,
a plurality of actuators including at least one tilt actuator to rotate the body, at least one scoop actuator to open and close the scoop, and at least one ramp actuator to open and close the ramp,
a plurality of sensors including at least one tilt sensor to measure the orientation of the body, at least one scoop sensor to measure the position of the scoop, at least one ramp sensor to measure the position of the ramp, at least one bundle container sensor to detect the presence of a bundle container within the body, at least one discharge sensor to detect discharged bundles, at least one rotation sensor to detect the rotation of the body and at least one optical sensor to detect whether one or more bundles are blocking the second opening, and a controller, coupled to the actuators and the sensors, to control the operation of the body, scoop and ramp to discharge a metered portion of bundles through the second opening of the body; and a bundle separator, located proximal to the bundle handling device, to receive, separate and transport the discharged bundles.

12. The bundle handling system of claim 11, wherein the tilt, scoop and ramp actuators are piston and push rod assemblies, the tilt sensor is an inductive sensor and the scoop and ramp sensors are end-of-stroke sensors, the bundle container sensor is a mechanical sensor, the rotation sensor is a potentiometer and the discharge sensor is an optical sensor.

13. The bundle handling system of claim 11, wherein the controller causes the body to rotate between the intermediate and discharge orientations when the discharge sensor detects discharged bundles, and rotates the body to the upright orientation when the discharge sensor does not detect discharged bundles.

14. The bundle handling system of claim 11, wherein the plurality of sensors include at least one safety sensor to detect whether an object is located within a predetermined distance from the body, and wherein the controller causes the rotation of the body to stop when the safety sensor detects the object.

15. The bundle handling system of claim 11, further comprising a door to cover the first opening.

16. The bundle handling system of claim 11, wherein the bundles include flats.

17. A mail bundle handling device, comprising:
a frame;
a body, mounted to the frame, including a first opening through which a plurality of mail bundles are loaded, and a second opening through which mail bundles are discharged, the body being operable between an upright orientation for loading mail bundles through the first opening, a discharge orientation for discharging mail bundles through the second opening, and an intermediate orientation for removing mail bundles that block the second opening,
a scoop, mounted to the body, to open and close a substantial portion of the second opening,
a ramp, mounted to the body, to open and close a remaining portion of the second opening,
a plurality of actuators for rotating the body relative to the frame and at least one of the scoop and the ramp relative to the body;
a plurality of sensors for measuring the orientation of the body and the position of at least one of the scoop and the ramp, and for detecting mail bundles being discharged from the second opening;
and
a controller, coupled to the plurality of actuators and the plurality of sensors, to control the operation of the body, scoop and ramp to discharge a metered portion of mail bundles through the second opening of the body.

18. The mail bundle handling device of claim 17, wherein:
the plurality of actuators include:
at least one tilt actuator to rotate the body,
at least one scoop actuator to open and close the scoop, and
at least one ramp actuator to open and close the ramp; and
the plurality of sensors include:
at least one tilt sensor to measure the orientation of the body, at least one scoop sensor to measure the position of the scoop, at least one ramp sensor to measure the position of the ramp, at least one mail bundle container sensor to detect the presence of a mail bundle container within the body, at least one discharge sensor to detect discharged mail bundles, at least one rotation sensor to detect the rotation of the body, at least one optical sensor to detect whether one or more mail bundles are blocking the second opening, and wherein the controller causes the body to rotate between the intermediate and discharge orientations when the discharge sensor detects discharged mail bundles, and rotates the body to the upright orientation when the discharge sensor no longer detects discharged mail bundles.

19. The mail bundle handling system of claim 18, wherein the plurality of sensors include at least one safety sensor to detect whether an object is located within a predetermined distance from the body, and wherein the controller causes the rotation of the body to stop when the safety sensor detects the object.

20. The mail bundle handling system of claim 1, wherein the mail bundles are packages, parcels or other material contained within a bulk container that is loaded into the body.

* * * * *